United States Patent [19]

Spahl et al.

[11] Patent Number: 6,160,484

[45] Date of Patent: Dec. 12, 2000

[54] PROCESS AND APPARATUS FOR THE DISPLAY AND PROVISION OF ALARM MEANS FOR MEASURED VALUES ON COMMUNICATIONS TERMINALS

[75] Inventors: Siegfried Spahl, Puchheim, Germany; Günter Lukas, Wien, Austria; Johann Köberl, Wien, Austria; Herwig Stöckl, Wien, Austria

[73] Assignee: Siemens Aktiengesellschaft, Munich, Germany

[21] Appl. No.: 09/171,792

[22] PCT Filed: Apr. 24, 1997

[86] PCT No.: PCT/DE97/00848

§ 371 Date: Oct. 26, 1998

§ 102(e) Date: Oct. 26, 1998

[87] PCT Pub. No.: WO97/41493

PCT Pub. Date: Nov. 6, 1997

[30] Foreign Application Priority Data

Apr. 26, 1996 [DE] Germany ................ 196 16 827

[51] Int. Cl.[7] .................................................. G08B 21/00
[52] U.S. Cl. ............. 340/635; 340/286.01; 340/825.06; 700/17; 708/139
[58] Field of Search ................ 340/635, 286.01, 340/286.02, 825.06, 825.36; 700/17; 708/139

[56] References Cited

U.S. PATENT DOCUMENTS 4,511,887  4/1985  Fiore .
4,823,280  4/1989  Mailandt et al. .
5,400,246  3/1995  Wilson et al. ...................... 364/146

FOREIGN PATENT DOCUMENTS

| 2 207 266 | 1/1989 | United Kingdom . |
| 2 283 845 | 5/1995 | United Kingdom . |
| WO 96/10313 | 4/1996 | United Kingdom . |
| WO 96/08753 | 3/1996 | WIPO . |
| WO 96/10313 | 4/1996 | WIPO . |

OTHER PUBLICATIONS

E. Flaschka, "Binäre Sensoren am Bus" Elektronik 1994, pp. 64–68.

B. Bärnreuther et al., "MAP–Anwendungsdienste über einem Kommunikationssystem für heterogene Feldbus–Verbunde", ATP Automatisierungstechnische Praxis, Jul. 1991, pp. 358–363.

D. Racklyeft et al., "Intelligent Map Gateway", Advances in Instrumentation and Control, pp. 1431–1436.

*Primary Examiner*—Julie Lieu
*Attorney, Agent, or Firm*—Hill & Simpson

[57] ABSTRACT

A method and apparatus for communicating and storing measured values that are measured on electrical equipment. The values are retrieved within the framework of a link controller of at least one communication terminal attached to the communication system. Alarm information is displayed optically and/or acoustically when predetermined values are transgressed either upwardly or downwardly.

11 Claims, 2 Drawing Sheets

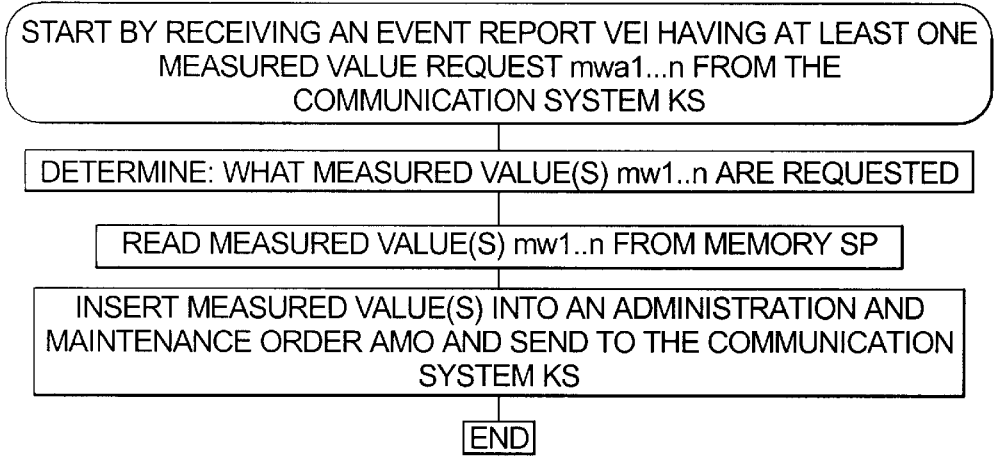
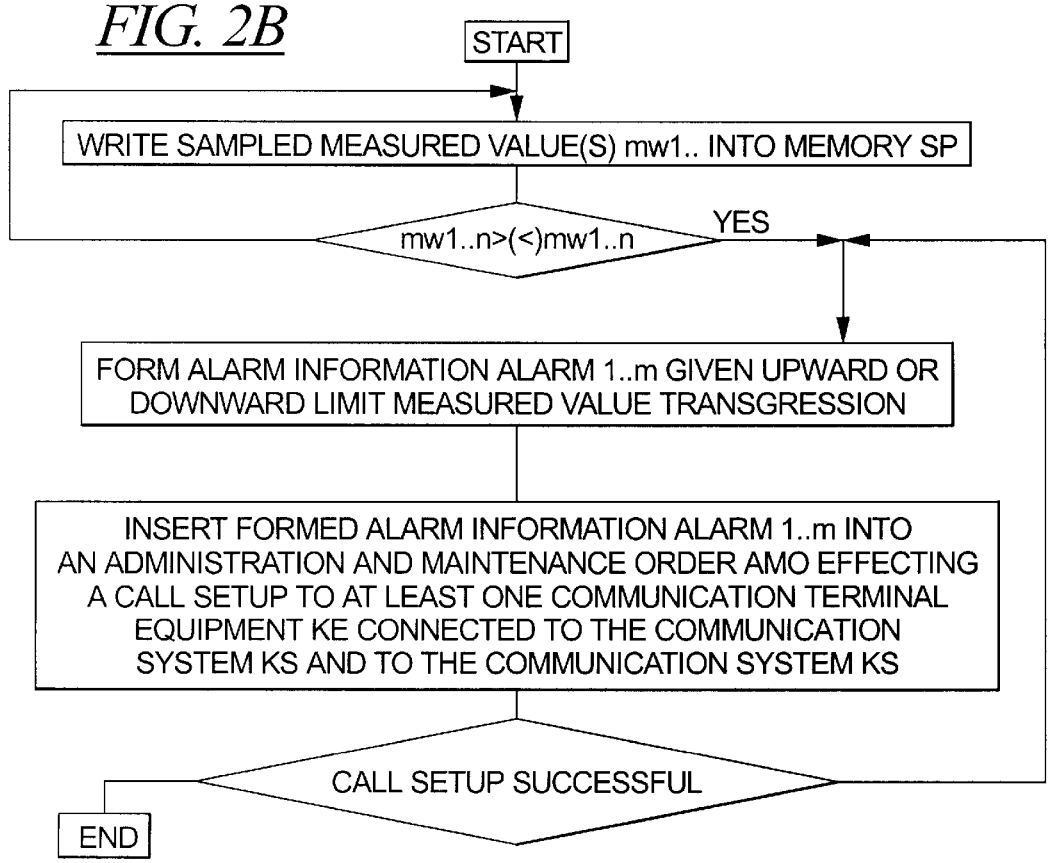

PROCESS AND APPARATUS FOR THE DISPLAY AND PROVISION OF ALARM MEANS FOR MEASURED VALUES ON COMMUNICATIONS TERMINALS

BACKGROUND OF THE INVENTION

1. Field of the Invention

The present invention relates generally to a method and apparatus for communicating measured values from electric equipment to monitoring locations.

2. Description of the Related Art

For monitoring electrical equipment, for example a generator in a power generating plant, the physical properties of the electrical equipment, for example the electrical power of the generators, are measured and the values that are measured, i.e. the measured values, are communicated to a central location or to a few decentralized locations and are displayed thereat with, for example, wall displays, i.e. appropriate display means.

For a control of performance features in communication networks, particularly private communication networks, further, a coupling of the switching equipment, particularly private branch exchanges, to an application means that is mainly realized by a data processing system is provided via an application interface or, respectively, ACL interface (application connectivity link). In conformity with the application interface, the private switching means, for example the private switching means HICOM 300 of Siemens AG, is physically connected to the application means via a V.24 interface or, alternatively, via an ISDN basic interface (SO). The application interface is preferably realized in an administration and maintenance unit—an integrated administration and maintenance server given the HICOM 300 switching means—a switching means realizes and controls the communication exchange according to a defined protocol—for example, MSV1—with defined messages. The information embedded into the messages correspond to the switching-oriented instructions and event reports of the switching means. A program structure suitable for the implementation of the switching-oriented instructions and for generating the switching-oriented event reports, i.e. a DVA-controlled program structure that supports connection setups, is provided therein as a link between the application means and the switching means, whereby the call control is influenced by the switching-oriented instructions and the current switching-oriented status of connections or, respectively, communication relationships is indicated by switching-oriented event reports.

The publication Advances in Instrumentation and Control, Vol. 47, Part 2, Research Triangle Park, N.C., US, pages 1431–1435, D. Racklyeft et al., "Intelligent Map Gateway", discloses a network to which different components are connected. A gateway with whose assistance a protocol matching is implemented is provided for the communication between proprietary components or, respectively, proprietary communication protocols. To this end, the individual components are polled and detected, data to be communicated are communicated to the applications provided therefor.

The British patent document GB-A-2 283 845 A discloses a temperature monitoring system wherein a plurality of sensor units are wirelessly connected to a central unit. Means for wireless transmission of measured values are provided in the microprocessor-controlled sensor unit. A memory for storing the wirelessly communicated measured values is provided in the central unit and means are likewise provided for the wireless transmission of measured values.

The published PCT application WO-A-96/08753 discloses a measuring arrangement wherein sensor units are networked via a bus network. The sensor units are controlled by an ASI master connected to the bus network. The ASI master thereby collects and stores measured values communicated from the sensor units. A connection to a communication network is not provided.

The publication Elektronik, No. 12, 1994, pages 64–68, Elmar Flashka, Binäre Sensoren am Bus", discloses a central unit to which a plurality of sensor units are connected via connections. The measured values measured by the sensor units are thereby cyclically interrogated or, respectively, polled by the central unit. The communicated measured values are acquired and stored in the central unit. The ASI system can be incorporated into a higher-ranking computer network.

SUMMARY OF THE INVENTION

An object underlying the invention is comprised in visualizing the measured values of electrical equipment, for example the measured power values of generators of a power generating plant, at different locations with the least outlay. This object is achieved by a method for the display of measured values at at least one communication network terminal equipment connected to a switching means, whereby an application means is connected to the communication system via an application interface, including:

acquiring at least one measured value measured at at least one electrical equipment and storing in the application means;

acquiring measured value requests communicated from at least one communication terminal equipment in the framework of a call control in the switching means with the assistance of a switching routine that can be influenced by the application means and are reported to the application means via the application interface with the assistance of a data transmission routine; and communicating the at least one stored measured value via the switching means with the assistance of the switching and data transmission routine of the switching means thereof to the communication network terminal equipment transmitting the measured value request.

A critical aspect of the inventive method is to be seen therein that the measured values are acquired in an application means connected to a switching means and are stored therein. A measured value request communicated from a communication network terminal equipment in the framework of a call control is acquired in the switching means and reported to the application means via the application interface. Subsequently, the stored measured values therein are communicated via the switching means and with the assistance thereof to the communication network terminal equipment that communicates the measurement request.

With the assistance of the inventive method, accordingly, arbitrary communication network terminal equipment of a switching means as well as of other switching means can fetch and display measured values, which were measured at electrical equipment, at arbitrary points in time. Accordingly, the inventive method achieves a greatest possible flexibility in the communication, switching and visualization of measured values at different geographical locations. Further, the economic outlay for the communication, switching and visualization of measured values is reduced, especially given utilization of already existing switching means or, respectively, of communication equipment connected thereto.

A further critical aspect of the inventive method is to be seen therein that the at least one measured value acquired in the application means is compared to at least one predetermined measured value limit stored in this application means, and, given an upward or downward transgression of this measured value limit, the upward or, respectively, downward transgression is optically and/or acoustically displayed at at least one predetermined communication terminal equipment with the assistance of a call control implemented in the communication system and controlled by the application means. As a result of this inventive measure, an alarm is automatically acoustically and/or optically displayed at a predetermined communication network terminal equipment—for example, at a central malfunction and monitoring location—given an upward or downward transgression of a measured value. Given a downward transgression of a measured value that represents the power output by a generator in a power generating plant, for example, a connection is thus automatically set up to a predetermined communication network terminal equipment—for example, a central monitoring location—and this downward transgression is displayed thereat as, for example, outage of the appertaining generator. A greatest possible flexibilization of the transmission of the alert to the greatest variety of locations at which, for example, the monitoring personnel is located is also thereby achieved.

The inventive method is especially advantageously employed for measured values that represent individual or overall measured power values at generators. With the assistance of the inventive method, the measured values can thereby be both fetched by arbitrary communication network terminal equipment at arbitrary times for the purpose of a check and a monitoring person or, respectively, personnel located at a communication network terminal equipment can also be alerted about an upward transgression or, respectively, downward transgression of the measured values.

According to an advantageous development of the inventive method, a traffic relationship group is configured for the at least one communication network terminal equipment in the switching means. As a result of this measure, the number of communication network terminal equipment can be limited to the desired or, respectively, required plurality of communication network terminal equipment—particularly in view of a group of communication network terminal equipment at which measured values can be visualized.

According to another advantageous development of the inventive method, the alerting and the upward or, respectively, downward transgression of the measured value are alphanumerically displayed at the user interface of the communications network terminal equipment. As a result of the alphanumerical display, both the measured values as well as indicators about the allocation of the downwardly or upwardly transgressed measured values to the technical equipment can be displayed in a simplest way.

Further advantageous developments of the inventive method as well as an advantageous embodiment of an application means for the implementation of the inventive method are provided as well. The measured values may be communicated to the application means or PC in an analog or digital form and are acquired, digitalized and stored.

The measured values may be cyclically sampled, whereby the sampling rate is matched to the respective application.

The measured values and the alert about an upward or downward measured value transgression are displayed at the user interface of the communication network terminal equipment in one embodiment.

A measured value request is represented by a predetermined telephone number that indicates a call setup communicated from an allocated communication network terminal equipment for the purpose of fetching measured values.

The call control to the communication network terminal equipment is preferably controlled in the switching means by a switching routine influenced by the application means and the communication of the measured values and of the information indicating the upward or downward transgression of the measured value limit is controlled by a data communication routine, whereby switching-oriented events are reported to the application means by the switching routine and switching-oriented actions are initiated according to administration and maintenance orders communicated from the application means.

The invention provides an application means, which in one embodiment is a personal computer, for the display of measured values at at least one communication network terminal means connected to a switching means, whereby an application means is connected to the switching means via an application interface, including:

means for the acquisition and storing of at least one measured value measured at at least one electrical equipment are provided in the application means;

a switching means having a switching routine for the acquisition of at least one measured value request communicated from at least one communication network terminal means in the framework of a call control and a data transmission routine for communicating the acquired measured value request to the application means via the application interface;

the switching routine and data transmission routine are provided in the switching means for communicating the at least one stored measured value via the switching means to the communication network terminal equipment and from which is communicated the measured value request.

The application means has at least one acquisition unit for acquiring the at least one measured value brought in via connecting lines; a microprocessor system connected to the at least one acquisition unit for storing the at least one acquired measured value and for the purpose of a communication of the at least one measured value or of an upward or downward measured value limit transgression to at least one predetermined communication network terminal equipment for the call control of the switching means; and an application interface unit connected to the microprocessor system and realizing an application interface for communicating measured value requests, measured values, information indicating upward or downward measured value transgression, switching-oriented events and administration and maintenance orders.

The application means is realized by a personal computer; and in that the at least one acquisition unit and the application interface unit are connected to the microprocessor system via the microprocessor system bus.

The application means includes a measured value routine realized by a program which is provided for controlling and monitoring the acquisition as well as storing of the measured values and the call control to at least one predetermined communication network terminal equipment.

BRIEF DESCRIPTION OF THE DRAWINGS

The inventive method or, respectively, inventive application means is explained in greater detail below with reference to a block circuit diagram and two flowcharts.

FIG. 2A is a flowchart for a requested display at a communication network terminal equipment; and FIG. 2B is a flowchart for an alert with respect to an upward or, respectively, downward transgression of a measured value at a predetermined communication network terminal equipment.

DETAILED DESCRIPTION OF THE PREFERRED EMBODIMENTS

Figure 1:
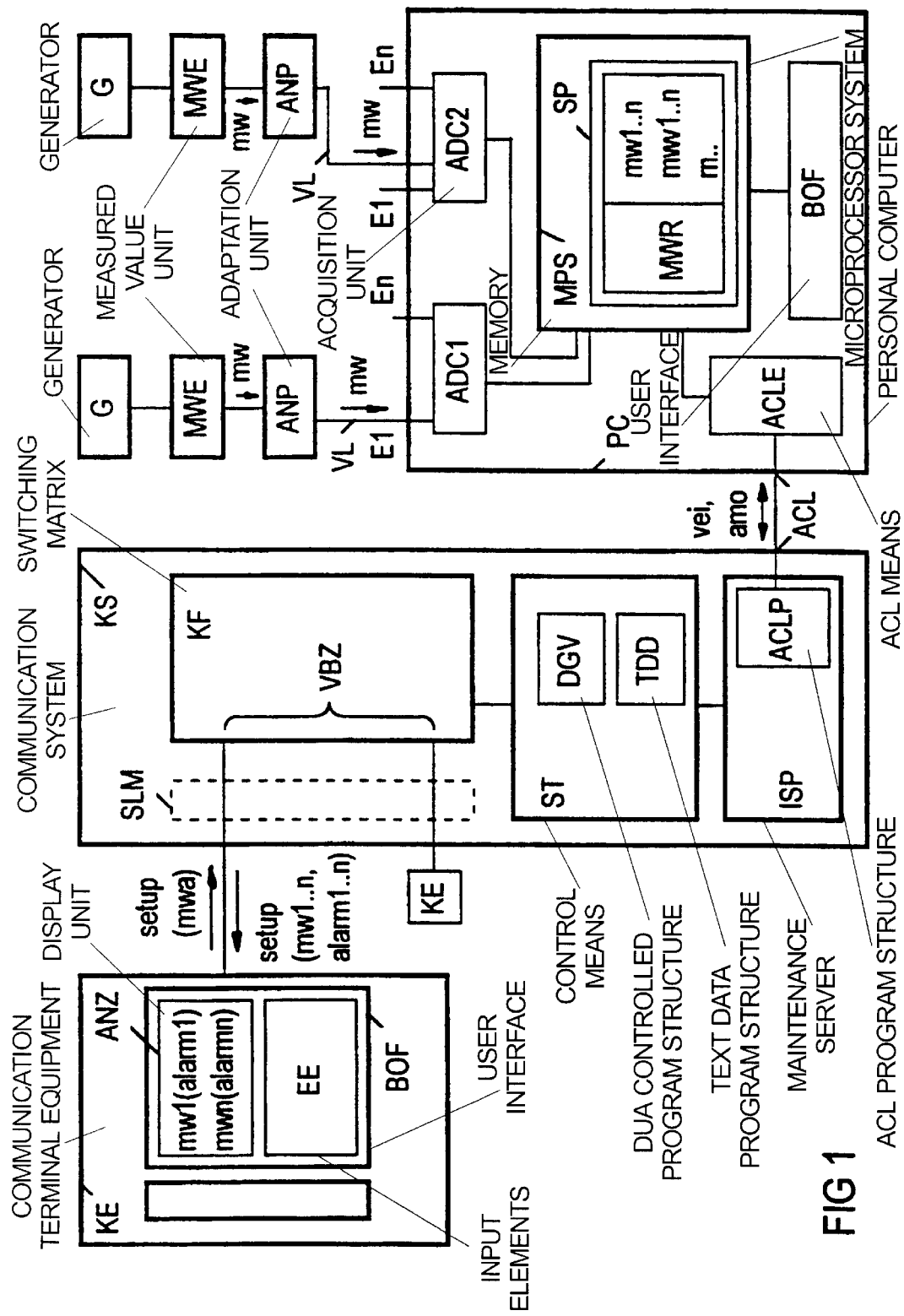
FIG. 1 is a block diagram which shows a communication arrangement for the implementation of the inventive method.

FIG. 1 shows a communication system KS—particularly a private communication system—with an ACL interface ACL to which an application means PC—referred to below as personal computer PC—realized by a personal computer is connected to an identically realized ACL interface ACL. In the communication system, the ACL interface ACL is realized by an ACL program structure ACLP implemented in an integrated administration and maintenance server IPS; in the personal computer PC, the ACL interface ACL is physically and procedurally realized in an ACL unit ACLE. The abbreviation ACL stands for applications connectivity link and means that a communication exchange for an application-dependent call control via a connection, i.e. a link, is controlled via this ACL interface ACL.

For the switching-oriented as well as the administration and maintenance control, the communication system KS comprises a control means ST that is connected to a switching matrix KF and to the integrated administration and maintenance server ISP. In addition to the critical switching-oriented and administration and maintenance program structure (not shown), a DVA-controlled program structure DGV that supports call setups—i.e. a switching routine DGV—for a collaboration with the personal computer PC and a text data program structure TDD—i.e. a data communication routine TDD—that controls the transmission of data or, respectively, text information communicated via the ACL interface ACL to at least one connected communication terminal equipment are implemented in the control means ST.

A traffic relationship group VBZ is configured, i.e. established, in the switching matrix KF with the assistance of administration and maintenance orders amo, communication terminal equipment KE connected to the communication system KS being allocated to said traffic relationship group VBZ—two allocated communication terminal equipment KE are shown by way of example. The communication terminal equipment are connected to the switching matrix KF via subscriber line modules SLM—indicated by a dashed rectangle. The communication terminal equipment KE are equipped with a user interface BOF that is formed by a display unit ANZ and by input elements EE—for example, the selection keyboard including additional function keys. Measured value requests mwa are formed in the communication terminal equipment KE with the assistance of these input elements EE in the framework of a call setup and are communicated to the communication system KS. The display unit is realized, for example, by an LCD display.

As a result of the program structure DGV supporting DVA-controlled call setups, all switching-oriented events vei—those of the communication terminal equipment KE allocated to the traffic relationship groups in the exemplary embodiment—as well as the measured value request mwa are acquired and communicated via the ACL interface ACL to a measured value routine MWR in the personal computer PC. Analogous thereto, the administration and maintenance orders amo communicated from the measured value routine MWR are implemented by the program structure DGV supporting DVA-controlled call setups, i.e. the indicated switching-oriented activities are initiated. Further, the measured values mw1 . . . n defined by a measured value request mwa are communicated to the text-data program structure TDD with the assistance of administration and maintenance orders amo and are communicated with the assistance thereof to the communication terminal equipment KE sending the measured value request.

In the personal computer PC, the ACL means ACLE is connected to a microprocessor system MPS to which a user interface BOF—formed by a picture screen means and a keyboard in personal computers—and, for example, two acquisition units ADC1,2 are connected. The measured value routine MWR is realized by a program in a memory SP of the microprocessor system MPS. For example, each of the acquisition units ADC1,2 comprises 15 inputs E1 . . . n for the acquisition of 15 measured values mw1 . . . n. Adaptation units ANP that are connected to a generator G via a measured value unit MWE are connected to some of these inputs E1 . . . n via connecting lines VL. The generators, for example, are generators for generating electrical energy in power plants. For example, the power—alternatively the voltage or the current—is measured with the assistance of the measured value unit MWE and a measured value mw is formed on the basis of the measurement. As warranted, the measured value mw is adapted to the physical conditions at the inputs E1 . . . n with the assistance of the adaptation unit ANP. For example, a measured value mw present in asymmetrical form is converted into a measured value mw present in symmetrical form—can ensue with a separating converting. The measured values mw present, for example, in analog form are converted into digital form in the acquisition unit ADC1,2 and are communicated to the measured value routine MWR in the microprocessor system MPS. The measured values mw1 . . . n are stored in the memory SP of the microprocessor system MPS with the assistance of the measured value routine MWR. The sampling of the measured values MW1 . . . n that are present, for example, in a continuous form with the assistance of the acquisition units ADC1,2 or, too, the measured value routine MWR ensues at cyclical intervals—for example in a clock of seconds. The sampling rate can be set or, respectively, adapted dependent on the application.

Further, additionally prescribed measured values mwv1 . . . m are stored in the memory SP of the microprocessor MPS according to the inventive method. These prescribed measured values mwv1 . . . m represent measured value limits; when they are downwardly or upwardly transgressed, an alarm information alarm1 . . . m is formed and sent via the ACL interface ACL to the communication system KS and are communicated with the assistance of the latter to a predetermined communication terminal equipment KE. The predetermined communication terminal equipment arranged by that person who can or, respectively, must initiate appropriate actions given a downward or upward transgression of measured values mw1 . . . n. Instead of a predetermined communication terminal equipment KE, alternatively, a plurality of predetermined communication terminal equipment to which a downward or, respectively, upward transgression of measured values mw1 . . . n is reported can be allocated. This measure enhances the suppression dependability given an occurrence of a fault in one of the generators G in a power plant. The telephone numbers rn . . . of the predetermined communication terminal equipment KE, i.e. the communication terminal equipment KE to be informed, are likewise stored in the memory SP of the microprocessor system MPS of the personal computer PC. Changes or, respectively, modifications of the telephone numbers rn . . . are possible with simple inputs at the user interface BOF of the personal computer PC, and the transmission of alarm information alarm1 . . . m to the greatest variety of communication terminal equipment KE can thus be achieved in a simple way.

FIGS. 2A and 2B show the functioning of the measured value routine MWR on the basis of self-explanatory flowcharts. In the flowchart of FIG. 2A, the measured value routine MWR is started by an event report vei communicated from the communication system KS, this event report vei reporting a KE call of one of the communication terminal equipment KE allocated to the traffic relationship group VBZ with a telephone number indicating a measured value request mwa. After the transmission of the administration and maintenance order amo containing measured values mw1 . . . n to the communication system KS, the communicated measured values mw1 . . . n are forwarded therein to the communication terminal equipment KE sending the measured value request mwa and are displayed therein, for example in the LCD display. In the flowchart according to FIG. 2B, the measured values mw present, for example, continuously, are sampled in the acquisition units ADC1,2 and are communicated to the measured value routine MWR. The sampling rate can be set dependent on the application. It is also assumed in the flowchart of FIG. 2B that a successful call setup for the transmission of alarm information alarm1 . . . m to the appertaining communication terminal equipment KE is reported to the measured value routine MWR with a switching-oriented event report vei. In the communication system KS, the alarm information alarm1 . . . n contained in the administration and maintenance order amo are communicated to a communication terminal equipment defined by the administration and maintenance order amo.

Although other modifications and changes may be suggested by those skilled in the art, it is the intention of the inventors to embody within the patent warranted hereon all changes and modifications as reasonably and properly come within the scope of their contribution to the art.

What is claimed is:

1. A method for displaying measured values at at least one communication network terminal equipment connected to a switching means, an application means being connected to the communication system via an application interface, comprising the steps of:

acquiring at least one measured value measured at at least one electrical equipment and storing the at least one measured value in the application means;

acquiring measured value requests communicated from at least one communication terminal equipment in framework of a call control in the switching means with assistance of a switching routine that can be influenced by the application means and reporting the measured requests to the application means via an application interface with assistance of a data transmission routine;

communicating the at least one stored measured value via the switching means with assistance of the switching and data transmission routine of the switching means thereof to the communication network terminal equipment transmitting the measured value request;

controlling call control to the communication network terminal equipment in the switching means by a switching routine influenced by the application means and the communication of the measured values and of the information indicating the upward or downward transgression of the measured value limit by a data communication routine;

reporting switching-oriented events to the application means by the switching routine; and initiating switching-oriented actions according to administration and maintenance orders communicated from the application means.

2. A method according to claim 1, further comprising the steps of:

acquiring at least one measured value in the application means and comparing the at least one measured value to a predetermined measured value limit; and, given an upward or downward transgression of the measured value limit by the at least one acquired measured value, indicating the upward or, respectively, downward transgression at at least one predetermined communication network terminal equipment with assistance of a call control implemented in the switching means and controlled by the application means.

3. A method according to claim 1, further comprising the step of:

measuring the measured values at generators.

4. A method according to claim 1, further comprising the step of:

configuring a traffic relationship group for the at least one communication network terminal equipment in the communication system.

5. A method according to claim 1, further comprising the step of:

communicating measured values to the application means.

6. A method according to claim 1, further comprising the steps of:

cyclically sampling the measured values including matching sampling rate to a respective application.

7. A method according to claim 1, further comprising the step of:

displaying measured values and an alert about an upward or downward measured value transgression at a user interface of the communication network terminal equipment.

8. A method according to claim 1, further comprising the step of:

representing a measured value request by a predetermined telephone number that indicates a call setup communicated from an allocated communication network terminal equipment for fetching measured values.

9. An apparatus for displaying measured values, comprising:

at least one communication network terminal;

a switch connected to said at least one communication network terminal;

an application interface;

an application device is connected to the switch via said application interface;

means for acquisition and storing of at least one measured value measured at at least one electrical equipment in the application device;

a switching routine in said switch for acquisition of at least one measured value request communicated from said at least one communication network terminal in a framework of a call control and a data transmission routine for communicating acquired measured value request to the application device via the application interface;

the switching routine and data transmission routine being provided in the switch for communicating the at least one stored measured value via the switching means to the communication network terminal equipment communicated the measured value request;

said application device including:

at least one acquisition unit for acquiring the at least one measured values brought in via connecting lines;

a microprocessor system connected to the at least one acquisition unit for storing the at least one acquired measured value and for the purpose of a communication of the at least one measured value or of an upward or downward measured value limit transgression to at least one predetermined communication network terminal equipment for the call control of the switching means; and an application interface unit connected to the microprocessor system and realizing an application interface for communicating measured value requests, measured values, information indicating upward or downward measured value transgression, switching-oriented events and administration and maintenance orders.

10. An apparatus according to claim 9, wherein said application device is a personal computer; and the at least one acquisition unit and the application interface unit are connected to the microprocessor system via a microprocessor system bus.

11. An apparatus according to claim 9, further comprising:

a measured value routine realized by a program for controlling and monitoring acquisition as well as storing of the measured values and call control to at least one predetermined communication network terminal equipment.

* * * * *